United States Patent
Lee et al.

(10) Patent No.: US 11,495,780 B2
(45) Date of Patent: Nov. 8, 2022

(54) METHOD OF PREPARING ELECTRODE FOR LITHIUM SECONDARY BATTERY AND ELECTRODE FOR LITHIUM SECONDARY BATTERY PREPARED THEREBY

(71) Applicant: LG CHEM, LTD., Seoul (KR)

(72) Inventors: Sol Nip Lee, Daejeon (KR); Young Geun Choi, Daejeon (KR); Song Taek Oh, Daejeon (KR)

(73) Assignee: LG Energy Solution, Ltd.

( * ) Notice: Subject to any disclaimer, the term of this patent is extended or adjusted under 35 U.S.C. 154(b) by 61 days.

(21) Appl. No.: 15/760,713

(22) PCT Filed: Jul. 7, 2017

(86) PCT No.: PCT/KR2017/007331
§ 371 (c)(1),
(2) Date: Mar. 16, 2018

(87) PCT Pub. No.: WO2018/016785
PCT Pub. Date: Jan. 25, 2018

(65) Prior Publication Data
US 2018/0205064 A1    Jul. 19, 2018

(30) Foreign Application Priority Data
Jul. 18, 2016  (KR) .................. 10-2016-0090525

(51) Int. Cl.
*H01M 4/36* (2006.01)
*H01M 4/04* (2006.01)
(Continued)

(52) U.S. Cl.
CPC ........... *H01M 4/04* (2013.01); *H01M 4/0404* (2013.01); *H01M 4/0471* (2013.01);
(Continued)

(58) Field of Classification Search
CPC .... H01M 4/04; H01M 4/0471; H01M 4/0404; H01M 4/366; H01M 4/36; H01M 4/139;
(Continued)

(56) References Cited

U.S. PATENT DOCUMENTS 9,728,769 B2   8/2017  Yamazaki
9,947,964 B2   4/2018  Hatta et al.
(Continued)

FOREIGN PATENT DOCUMENTS

EP    1 501 136 A1    1/2005
EP    2797142 A1    10/2014
(Continued)

OTHER PUBLICATIONS

WO 2012144439 Kajiwara WIPO machine translation (Year: 2014).*
(Continued)

*Primary Examiner* — William E McClain
*Assistant Examiner* — Kirsten B Tysl
(74) *Attorney, Agent, or Firm* — Lerner, David, Littenberg, Krumholz & Mentlik, LLP

(57) ABSTRACT

The present invention relates to a method of preparing an electrode for a lithium secondary battery and an electrode for a lithium secondary battery prepared thereby, wherein, since the method may suppress the migration of a binder and may uniformly control the distribution of the binder in the electrode by forming a plurality of negative electrode active material layers and allowing a drying condition of each of the negative electrode active material layers to be different, the method may improve life characteristics by improving adhesion between a negative electrode active material and a current collector and may improve charging characteristics by reducing interfacial resistance of the negative electrode.

10 Claims, 2 Drawing Sheets a)

b)

c)

(51) Int. Cl.
*H01M 4/139* (2010.01)
*H01M 4/62* (2006.01)
*H01M 10/0525* (2010.01)
*H01M 4/02* (2006.01)

(52) U.S. Cl.
CPC ............ *H01M 4/139* (2013.01); *H01M 4/36* (2013.01); *H01M 4/366* (2013.01); *H01M 4/622* (2013.01); *H01M 10/0525* (2013.01); *H01M 2004/021* (2013.01); *H01M 2220/10* (2013.01); *H01M 2220/20* (2013.01); *Y02E 60/10* (2013.01)

(58) Field of Classification Search
CPC ........ H01M 4/622; H01M 4/621; H01M 4/13; H01M 10/0525; H01M 2220/20; H01M 2220/10; H01M 2004/021; Y02E 60/10; Y02P 70/50
See application file for complete search history.

(56) References Cited

U.S. PATENT DOCUMENTS

| | | | |
|---|---|---|---|
| 2005/0175900 A1 | 8/2005 | Yasuda et al. | |
| 2010/0273052 A1* | 10/2010 | Sakitani | H01M 4/139 |
| | | | 429/217 |
| 2012/0009472 A1 | 1/2012 | Yokoi et al. | |
| 2012/0009475 A1 | 1/2012 | Nakura | |
| 2013/0224584 A1* | 8/2013 | Sung | H01M 4/13 |
| | | | 429/211 |
| 2014/0287316 A1 | 9/2014 | Ahn et al. | |
| 2014/0363736 A1 | 12/2014 | Kim et al. | |
| 2015/0380739 A1 | 12/2015 | Watanabe et al. | |
| 2016/0211505 A1 | 7/2016 | Yamazaki | |
| 2017/0092929 A1* | 3/2017 | Momma | H01M 4/621 |
| 2017/0110760 A1 | 4/2017 | Hatta et al. | |
| 2017/0125788 A1 | 5/2017 | Ahn et al. | |
| 2018/0006291 A1* | 1/2018 | Kim | H01M 50/20 |

FOREIGN PATENT DOCUMENTS

| | | | | |
|---|---|---|---|---|
| EP | 2863457 A1 | | 4/2015 | |
| JP | 2008028028 A | | 2/2008 | |
| JP | 2010-282873 A | | 12/2010 | |
| JP | 2011192539 A | * | 9/2011 | |
| JP | 2012-22794 A | | 2/2012 | |
| JP | 5261961 B2 | * | 8/2013 | |
| JP | 5325332 B1 | * | 10/2013 | .......... H01M 4/0404 |
| JP | 2015-50055 A | | 3/2015 | |
| JP | 2016-27549 A | | 2/2016 | |
| JP | 2016-58375 A | | 4/2016 | |
| KR | 10-2014-0137660 A | | 12/2014 | |
| KR | 10-2015-0071453 A | | 6/2015 | |
| WO | WO-2012001814 A1 | * | 1/2012 | .............. H01M 4/13 |
| WO | WO 2012/144439 A1 | | 10/2012 | |
| WO | WO 2014/116029 A1 | | 7/2014 | |
| WO | WO 2015/166621 A1 | | 11/2015 | |
| WO | WO-2016148383 A1 | * | 9/2016 | .......... H01M 10/052 |

OTHER PUBLICATIONS

JP2010282873 Hiromoto translation (Year: 2010).*
JP-5325332-B1 Fujita Espacenet translation (Year: 2013).*
WO2012001814 Ishida et al. Espacenet machine translation (Year: 2012).*
JP2011192539A Takahashi Espacenet translation (Year: 2011).*
JP5261961B2 Espacenet machine translation (Year: 2013).*
Extended European Search Report, dated Aug. 24, 2018, for European Application No. 17831258.3.
Font et al., "Binder Migration During Drying of Lithium-ion Battery Electrodes: Modelling and Comparison to Experiment," Journal of Power Sources, vol. 393, 2018 (Available online May 12, 2018), pp. 177-185, XP055499359.
International Search Report, issued in PCT/KR2017/007331, dated Oct. 20, 2017.
Written Opinion of the International Searching Authority, issued in PCT/KR2017/007331, dated Oct. 20, 2017.

* cited by examiner

METHOD OF PREPARING ELECTRODE FOR LITHIUM SECONDARY BATTERY AND ELECTRODE FOR LITHIUM SECONDARY BATTERY PREPARED THEREBY

CROSS-REFERENCE TO RELATED APPLICATIONS

This application claims the benefit of Korean Patent Application No. 10-2016-0090525, filed on Jul. 18, 2016, in the Korean Intellectual Property Office, the disclosure of which is incorporated herein in its entirety by reference.

TECHNICAL FIELD

The present invention relates to a method of preparing an electrode for a lithium secondary battery and an electrode for a lithium secondary battery prepared thereby, and more particularly, to a method of preparing an electrode for a lithium secondary battery which may uniformly distribute a binder in the electrode, and an electrode for a lithium secondary battery prepared thereby.

BACKGROUND ART

Recently, demand for batteries as an energy source has been increased rapidly as technology development and demand with respect to mobile devices have increased, and, while a hybrid electric vehicle (HEV), a plug-in hybrid electric vehicle (PHEV), and an electric vehicle (EV) are in the spotlight as a future car, diverse research into batteries that may meet a variety of needs has been conducted. Particularly, research into lithium secondary batteries having excellent life and cycle characteristics as well as high energy density, as power sources of these vehicles, has been actively conducted.

Also, in line with growing concerns about environmental issues, high capacity design of an electrode for the preparation of lithium secondary batteries having high energy density, high output, and high discharge voltage, as power sources of these devices, is required while demand for high-capacity batteries is expanded due to the growth of the market of devices using high-capacity batteries, for example, electric vehicles and hybrid electric vehicles, which may replace vehicles using fossil fuels, such as gasoline vehicle and diesel vehicle, one of major causes of air pollution.

Accordingly, for the high capacity design of the electrode, a high loading electrode, in which an amount of an active material is increased, has been attempted, but, since such high loading design has many limitations such as over voltage of a negative electrode and an increase in electrode resistance, there is a need to address the limitations.

In the present invention, as a result of conducting research into solving problems associated with the migration of a binder which occurs particularly in a drying process in a method of preparing a high loading negative electrode, the present researchers have found a preparation method which may enhance adhesion of the electrode and may improve charging characteristics by uniformly controlling the distribution of the binder in the electrode.

PRIOR ART DOCUMENT

Patent Document (Patent Document 1) KR 10-2015-0071453 A (2015 Jun. 26)

DISCLOSURE OF INVENTION

Technical Problem

An aspect of the present invention provides a method of preparing an electrode for a lithium secondary battery, which may suppress the migration of a binder and may uniformly control the distribution of the binder in the electrode by forming a plurality of negative electrode active material layers and allowing a drying condition of each of the negative electrode active material layers to be different, and an electrode for a lithium secondary battery prepared thereby.

Another aspect of the present invention provides a method of preparing an electrode for a lithium secondary battery, which may suppress the migration of a binder and may uniformly control the distribution of the binder in the electrode by allowing an amount of the binder included in each of the negative electrode active material layers to be different, and an electrode for a lithium secondary battery prepared thereby.

Solution to Problem

According to an aspect of the present invention, there is provided a method of preparing a negative electrode for a lithium secondary battery including:

(a) preparing a negative electrode collector;

(b) coating the negative electrode collector with a first negative electrode active material composition including a first negative electrode active material and a first binder;

(c) performing primary drying of the coated first negative electrode active material composition to form a first negative electrode active material layer;

(d) coating the first negative electrode active material layer with a second negative electrode active material composition including a second negative electrode active material and a second binder; and (e) performing secondary drying of the coated second negative electrode active material composition to form a second negative electrode active material layer, wherein a secondary drying rate is lower than a primary drying rate.

According to another aspect of the present invention, there is provided a negative electrode for a lithium secondary battery prepared by the method according to the present invention including:

a negative electrode collector;

a first negative electrode active material layer including a first negative electrode active material and a first binder and formed on the negative electrode collector; and a second negative electrode active material layer including a second negative electrode active material and a second binder and formed on the first negative electrode active material layer, wherein a weight ratio of the second binder included in the second negative electrode active material layer is smaller than a weight ratio of the first binder included in the first negative electrode active material layer.

According to another aspect of the present invention, there is provided a lithium secondary battery, a battery module, and a battery pack which include the negative electrode for a lithium secondary battery.

Advantageous Effects of Invention

Since a preparation method according to the present invention may suppress the migration of a binder and may uniformly control the distribution of the binder in the electrode, the preparation method may improve life characteristics by improving adhesion between a negative electrode active material and a current collector and may improve charging characteristics by reducing interfacial resistance of the negative electrode.

BRIEF DESCRIPTION OF DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a negative electrode for a lithium secondary battery including the steps of:

(a) preparing a negative electrode collector;

(b) coating the negative electrode collector with a first negative electrode active material composition including a first negative electrode active material and a first binder;

(c) performing primary drying of the coated first negative electrode active material composition to form a first negative electrode active material layer;

(d) coating the first negative electrode active material layer with a second negative electrode active material composition including a second negative electrode active material and a second binder; and (e) performing secondary drying of the coated second negative electrode active material composition to form a second negative electrode active material layer, wherein a secondary drying rate is lower than a primary drying rate.

The preparation method according to the present invention may suppress the migration of a binder and may uniformly control the distribution of the binder in the electrode by forming a plurality of negative electrode active material layers and allowing a drying condition of each of the negative electrode active material layers to be different.

A conventional preparation method has limitations in that a binder is not uniformly distributed in an electrode in a drying step during a preparation process of a negative electrode.

Specifically, while migration of the binder to an uppermost layer portion of a negative electrode active material layer, in which a negative electrode active material and a separator face each other in the drying process during the preparation of the negative electrode, occurs, the binder is less distributed in a lowermost layer portion of the negative electrode active material layer in which the negative electrode active material and a current collector face each other, and, as a result, adhesion between the negative electrode active material and the current collector is reduced to degrade cycle characteristics. Thus, lifetime of a battery may be reduced, and there is a limitation in that the binder concentrated in the uppermost layer portion of the negative electrode active material layer prevents diffusion of lithium ions during charging to increase interfacial resistance of the negative electrode.

Particularly, such limitations become more serious as a loading amount of the electrode active material is increased. In a high loading design of the negative electrode, when the negative electrode is formed as a single layer, a coating rate is not constant depending on a depth (position) of the negative electrode active material layer as a thickness of the electrode is increased, and, in drying, drying rate and temperature become not constant. During the drying of the negative electrode, a portion directly exposed to heat or hot air is dried faster than other portions and this tendency increases as the thickness is increased. This may induce the migration of the binder or a conductive agent in the negative electrode, and thus, a limitation, in which adhesion or conductivity is non-constant in the negative electrode, becomes more serious.

Thus, in the present invention, since a negative electrode is formed in a multilayer structure composed of two or more negative electrode active material layers and the two or more negative electrode active material layers having a predetermined thickness are stacked in the high loading design of the negative electrode, the migration of the binder during drying is allowed to be suppressed in comparison to a case in which the negative electrode is formed as a single layer.

The reason for this is that, in a case in which the negative electrode active material is coated in multiple layers, in any one of the negative electrode active material layers, even if the migration of the binder occurs toward an upper layer portion of the corresponding negative electrode active material layer, a structure, in which the binder is uniformly distributed across the entire negative electrode active material, may be obtained in terms of the entire negative electrode.

According to an embodiment of the present invention, the negative electrode includes a multilayer-structured negative electrode active material layer including two or more negative electrode active material layers, wherein, hereinafter, in the present specification, the negative electrode active material layer facing a current collector is referred to as a lowermost layer portion of the negative electrode active material layer, and the negative electrode active material layer facing a separator is referred to as an uppermost layer portion of the negative electrode active material layer. Also, other layers as well as the negative electrode active material layer may be disposed between the lowermost layer portion of the negative electrode active material layer and the uppermost layer portion of the negative electrode active material layer.

According to an embodiment of the present invention, the negative electrode has a structure in which a negative electrode collector, a first negative electrode active material layer, and a second negative electrode active material layer are stacked, wherein the first negative electrode active material layer is the lowermost layer portion of the negative electrode active material layer, and the second negative electrode active material layer is the uppermost layer portion of the negative electrode active material layer.

According to an embodiment of the present invention, first, a step of (a) preparing a negative electrode collector is performed.

Any negative electrode collector may be used as the negative electrode collector so long as it is a highly conductive metal to which a negative electrode active material may be easily adhered and is not reactive within a voltage range of an electrochemical device. Types of the collector is not particularly limited, but, for example, stainless steel, aluminum, nickel, titanium, fired carbon, aluminum or stainless steel that is surface-treated with one of carbon, nickel, titanium, silver, or the like. Also, microscopic irregularities may be formed on the surface of the collector to improve the adhesion of a negative electrode active material, and the negative electrode collector may be used in various shapes such as that of a film, a sheet, a foil, a net, a porous body, a foam body, a non-woven fabric body, and the like.

Specifically, aluminum, nickel, and a foil prepared by a combination thereof may be used as the negative electrode collector, and substrates formed of the above materials may be stacked and used. In a specific embodiment of the present invention, a thickness of the current collector may vary according to desired battery characteristics in a battery prepared by using the negative electrode according to the present invention.

According to an embodiment of the present invention, steps of (b) coating the negative electrode collector with a first negative electrode active material composition including a first negative electrode active material and a first binder; (c) performing primary drying of the coated first negative electrode active material composition to form a first negative electrode active material layer; (d) coating the first negative electrode active material layer with a second negative electrode active material composition including a second negative electrode active material and a second binder; and (e) performing secondary drying of the coated second negative electrode active material composition to form a second negative electrode active material layer are performed.

The forming of the negative electrode active material layer may be repeated several times in a case in which n negative electrode active material layers are desired to be formed.

According to an embodiment of the present invention, a secondary drying rate may be lower than a primary drying rate.

Specifically, the secondary drying rate denotes a drying rate of a relatively upper layer portion of the multi layer-structured negative electrode active material layer, and the primary drying rate denotes a drying rate of a relatively lower layer portion.

Since a migration phenomenon of the binder toward the upper layer portion of the negative electrode active material layer, which occurs due to the evaporation of a solvent included in the negative electrode active material composition in a drying process, depends on the drying rate, the migration phenomenon of the binder is intensified as the drying rate is increased. Thus, in the present invention, the migration phenomenon of the binder is alleviated by allowing the secondary drying rate of the relatively upper layer portion in the multi layer-structured negative electrode active material layer to be lower than the primary drying rate of the relatively lower layer portion.

In the present invention, among various factors affecting the drying rate, a secondary drying temperature is set to be lower than a primary drying temperature.

Figure 1:
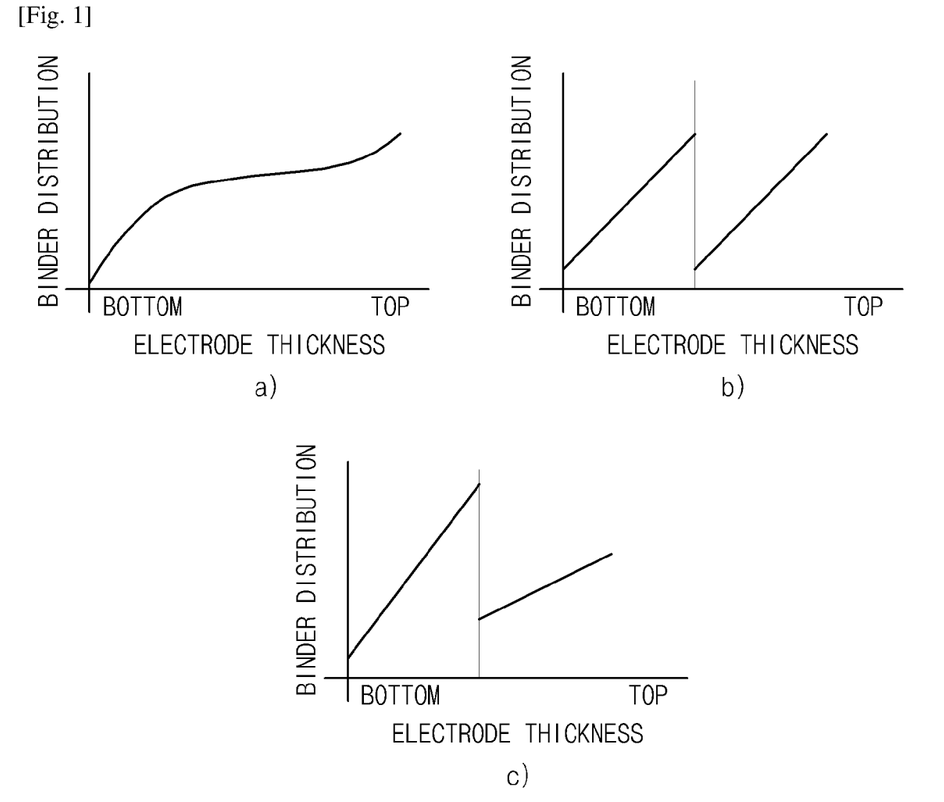
FIG. 1 schematically illustrates a distribution of a binder distributed in negative electrodes for a secondary battery prepared according to Examples and Comparative Example of the present invention.

Referring to FIG. 1, (a) is a graph schematically illustrating the distribution of a binder according to an electrode thickness in a method of preparing a single-layered electrode. In the single-layered electrode, diffusion of lithium ions into the electrode may be inhibited due to the migration phenomenon of the binder toward an upper layer portion, resistance of the electrode may be increased due to the excessive occurrence of lithium precipitation on a surface, and rapid charging characteristics may be degraded.

(b) is a graph schematically illustrating the distribution of a binder according to an electrode thickness in a method of preparing a multilayer-structured electrode, wherein the binder may be uniformly distributed in the electrode in comparison to (a) in which the single-layered electrode is prepared.

(c) schematically illustrates the distribution of a binder in a case in which the upper layer portion of the electrode active material layer is dried at a temperature relatively lower than that of the lower layer portion in a method of preparing a multi layer-structured electrode. As illustrated in the drawing, in the case that the drying temperature of the upper layer portion is lower than that of the lower layer portion, it may be confirmed that the migration of the binder is alleviated in comparison to the case of (b) as the drying rate is reduced.

According to an embodiment of the present invention, the secondary drying temperature may be 20° C. to 80° C., for example, 30° C. to 60° C. lower than the primary drying temperature. According to an embodiment of the present invention, the primary drying temperature may be in a range of 80° C. to 120° C., and the secondary drying temperature may be in a range of 40° C. to 60° C.

The secondary drying temperature and the primary drying temperature are more meaningful at a specific loading ratio of the negative electrode active material of the first negative electrode active material layer to the second negative electrode active material layer and in a negative electrode of an aqueous base, and this will be described later.

In a case in which a difference between the secondary drying temperature and the primary drying temperature is excessively smaller than the above range, since a difference between the drying rate of the upper layer portion and the drying rate of the lower layer portion is not large, the migration phenomenon of the binder toward the upper layer portion of the negative electrode active material layer, which is desired to be addressed by the present invention, may not be alleviated, and, in a case in which the temperature difference is excessively larger than the above range, since the drying rate of the upper layer portion is excessively low, workability may not be good.

According to an embodiment of the present invention, a weight ratio of the first binder of the first negative electrode active material layer to the second binder of the second negative electrode active material layer is in a range of 5:5 to 6:4. Specifically, a weight ratio of the first binder to the first negative electrode active material composition is in a range of 2.0 wt % to 3.0 wt %, and a weight ratio of the second binder to the second negative electrode active material composition is in a range of 1.0 wt % to 2.5 wt %, for example, 1.0 wt % to 2.0 wt %.

In a case in which an amount of the second binder is larger than the above range, the diffusion of the lithium ions into the electrode may be inhibited due to the excessive amount of the migrated binder in the second negative electrode active material layer, the charging characteristics may be degraded due to an increase in the interfacial resistance because the lithium precipitation on the surface is increased, and battery capacity and output characteristics may be reduced due to the low amount of the negative electrode active material. In a case in which the amount of the second binder is smaller than the above range, since a contact between the negative electrode active materials is not sufficient, the movement of the lithium ions may not be easy, and there may be a limitation in structural stability of the electrode such as exfoliation of the electrode.

According to an embodiment of the present invention, the first and second negative electrode active material compositions may further include a negative electrode active material, a binder, a conductive agent, and/or other additives, and may be prepared by adding these materials to a solvent and mixing them together, and the first and second negative electrode active material layers may be formed by sequentially coating the current collector with the first and second negative electrode active material compositions and rolling the coated current collector.

The binder migration issue, as a problem to be solved by the present invention, may become more serious in the preparation of the negative electrode by the aqueous base. In the preparation of the negative electrode by the aqueous base, it is desirable to use water as a solvent. In this case, an aqueous binder, such as a styrene-butadiene rubber (SBR), may be used as the binder, and the reason for this is that water, as the solvent of the negative electrode active material composition, evaporates from the negative electrode active material layer in the drying process and the migration of the binder toward the upper layer portion of the negative electrode active material is further intensified.

According to an embodiment of the present invention, the first binder and the second binder may be the same or may be different from each other.

The first binder is the binder included in the first negative electrode active material layer facing the current collector, wherein it is desirable to use a binder having good adhesion to the active material layer and the current collector. The first active material layer is adhered to the current collector so that electrons discharged from the active material layer may smoothly move to the current collector. Thus, it is important not to allow a gap between the current collector and the active material to generate due to a decrease in the adhesion to the current collector. For this purpose, there is a need to use a binder, which minimizes the migration of the binder and has good adhesion at the same time, as the first binder.

According to an embodiment of the present invention, the first binder may include at least one selected from the group consisting of polyvinylidene fluoride, carboxymethylcellulose, a styrene-butadiene rubber (SBR), polyimide, polyamideimde, polyvinyl alcohol, hydroxypropylcellulose, polyvinyl chloride, carboxylated polyvinyl chloride, polyvinyl fluoride, a polymer containing ethylene oxide, polyvinylpyrrolidone, polyurethane, polytetrafluoroethylene, polyethylene, polypropylene, an acrylated styrene-butadiene rubber, and an epoxy resin, and, for example, a styrene-butadiene rubber, which may effectively address the binder migration issue by the preparation method of the present invention, may be used.

Also, the second binder is the binder included in the second negative electrode active material layer in contact with the electrolyte solution, wherein there is a need to use a binder which minimizes the migration of the binder and has a good impregnating property to the electrolyte solution at the same time.

According to an embodiment of the present invention, the second binder may be a copolymer of hexafluoropropylene and at least one selected from the group consisting of polyvinylidene fluoride, carboxymethylcellulose, a styrene-butadiene rubber (SBR), polyimide, polyamideimde, polyvinyl alcohol, hydroxypropylcellulose, polyvinyl chloride, carboxylated polyvinyl chloride, polyvinyl fluoride, a polymer containing ethylene oxide, polyvinylpyrrolidone, polyurethane, polytetrafluoroethylene, polyethylene, polypropylene, an acrylated styrene-butadiene rubber, and an epoxy resin, and, for example, may be a copolymer of a styrene-butadiene rubber and hexafluoropropylene.

According to an embodiment of the present invention, the first negative electrode active material and the second negative electrode active material may be the same or may be different from each other, and a carbon material, which may typically intercalate and deintercalate lithium ions, lithium metal, silicon, or tin may be used as the negative electrode active material. Preferably, a carbon material may be used, and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The first and second negative electrode active materials may be included in an amount of 80 wt % to 99 wt %, for example, 90 wt % to 98 wt %, based on the first and second negative electrode active material compositions.

Also, the conductive agent is added to secure or improve conductivity, wherein any conductive agent may be used without particular limitation as long as it has excellent electrical conductivity and has conductivity without causing a side reaction in an internal environment of the secondary battery or adverse chemical changes in the battery. Specifically, a carbon-based material having high conductivity may be used as the conductive agent. As the carbon-based material, carbon black, acetylene black, channel black, Ketjen black, furnace black, lamp black, and thermal black may be used alone, or a mixture of two or more thereof may be used.

The conductive agent may be included in an amount of 0.2 wt % to 5 wt %, for example, 1 wt % to 3 wt %, based on the first and second negative electrode active material compositions.

According to an embodiment of the present invention, a loading amount of the entire multi layer-structured negative electrode active material including the first and second negative electrode active material layers is in a range of 3 mAh/cm$^2$ to 6 mAh/cm$^2$.

Since the migration phenomenon of the binder to be solved by the present invention becomes more serious in the above-described preparation of the high loaded negative electrode, the effect of the present invention suppressing the migration of the binder and uniformly controlling the distribution of the binder in the electrode may be more meaningful for the case of having the above range of the loading amount.

Thus, in a case in which a total sum of the loading amount of the negative electrode active material is in a range of 3 mAh/cm² to 6 mAh/cm², it is desirable to coat and form the negative electrode active material in a multilayer structure of two or more layers rather than to coat the negative electrode active material in a single layer.

Also, according to an embodiment of the present invention, a loading ratio of the negative electrode active material of the first negative electrode active material layer to the second negative electrode active material layer is in a range of 5:5 to 6:4.

The preparation method according to the present invention may suppress the migration of the binder and may uniformly controlling the distribution of the binder in the electrode by forming the multi layered negative electrode active material layer and allowing the drying condition of each of the negative electrode active material layers to be different.

With respect to the drying of the electrode active material, the drying rate and temperature become not constant as the thickness of the electrode or the loading amount of the electrode active material is increased. Also, these non-constant drying rate and temperature intensify the migration of the binder or conductive agent in the electrode, and, eventually, intensify the limitation in which the adhesion or conductivity is non-constant in the electrode.

Thus, in order to uniformly distribute the binder of the present invention, the drying rate and the drying temperature of each layer are allowed to be constant, and it is desirable to maintain the loading ratio of each layer of the multiple negative electrode active material layers at a specific ratio so as to minimize the migration of the binder.

Thus, in a case in which the loading ratio of the negative electrode active material of the first negative electrode active material layer to the second negative electrode active material layer is in a range of 5:5 to 6:4, the present invention may minimize the migration phenomenon of the binder by drying the first and second negative electrode active material layers at temperatures in which the secondary drying temperature is 20° C. to 80° C., for example, 30° C. to 60° C. lower than the primary drying temperature.

In a case in which the loading amount of the negative electrode active material of the first negative electrode active material layer is small equal to or less than the above range, the loading amount may be excessively low, and the preparation of the electrode may be problematic when negative electrode active material particles having a particle diameter ($D_{50}$) of 10 μm to 20 μm are used. In a case in which the loading amount of the negative electrode active material of the second negative electrode active material layer is large equal to or greater than the above range, since the migration phenomenon of the binder may be intensified even in each layer, an improvement of battery performance of the present invention may be insignificant.

Also, the present invention provides a negative electrode for a lithium secondary battery prepared by the preparation method of the present invention which includes: a negative electrode collector; a first negative electrode active material layer including a first negative electrode active material and a first binder and formed on the negative electrode collector; and a second negative electrode active material layer including a second negative electrode active material and a second binder and formed on the first negative electrode active material layer, wherein a weight ratio of the second binder included in the second negative electrode active material layer is smaller than a weight ratio of the first binder included in the first negative electrode active material layer.

Since the weight ratio of the second binder included in the second negative electrode active material layer as the upper layer portion of the negative electrode active material is allowed to be smaller than the weight ratio of the first binder included in the first negative electrode active material layer, the negative electrode of the present invention may improve charging characteristics by facilitating the diffusion of the lithium ions into the electrode through the surface of the electrode while maintaining the adhesion between the active material and the current collector equivalent to the conventional case.

Herein, descriptions of the first and second binders and the loading ratio of the negative electrode active material of the first negative electrode active material layer to the second negative electrode active material layer are the same as those described above.

Furthermore, the present invention provides a lithium secondary battery including the negative electrode.

The lithium secondary battery of the present invention may be prepared according to a typical method known in the art, and, for example, may be prepared by disposing a separator between a positive electrode and the negative electrode and injecting the electrolyte solution in which a lithium salt is dissolved, and the positive electrode may be prepared by coating a positive electrode collector with a positive electrode active material composition including a positive electrode active material and a binder and then drying and rolling the coated positive electrode collector.

According to an embodiment of the present invention, the positive electrode collector is similar to that described in the negative electrode collector, a lithium transition metal oxide may be used as the positive electrode active material, and, the positive electrode active material, for example, may be a mixture of at least one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0≤y<1$), $Li_xNi_{1-y}Mn_yO_2$ ($0.5<x<1.3$, $0≤y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), and $Li_xFePO_4$ ($0.5<x<1.3$).

According to an embodiment of the present invention, the separator is disposed between the positive electrode and the negative electrode, and an insulating thin film having high ion permeability and mechanical strength is used. A porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or may be used by laminating two or more layers thereof as the separator. In addition, a typical porous nonwoven fabric, for example, a nonwoven fabric formed of high melting point glass fibers or polyethylene terephthalate fibers may be used, but the present invention is not limited thereto.

According to an embodiment of the present invention, the electrolyte solution may be a mixed organic solvent of at least one selected from the group consisting of propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, and butyl propionate.

Also, the electrolyte solution according to the present invention may further include a lithium salt, and an anion of the lithium salt may be at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium secondary battery according to the present invention may be a cylindrical type secondary battery, a prismatic type secondary battery, and a pouch type secondary battery, but the lithium secondary battery is not limited thereto as long as it corresponds to a charge and discharge device.

Furthermore, the present invention provides a battery module including the lithium secondary battery as a unit cell and a battery pack including the battery module.

The battery pack may be used as a power source of at least one medium and large sized device selected from the group consisting of a power tool; electric cars including an electric vehicle (EV), a hybrid electric vehicle (HEV), and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

(1) Preparation of Negative Electrode for Lithium Secondary Battery

A first negative electrode active material composition was prepared by mixing a negative electrode active material, in which artificial graphite and natural graphite having an average diameter ($D_{50}$) of 10 μm to 20 μm were mixed, acetylene black (conductive agent), carboxymethylcellulose (CMC, thickener), and a styrene-butadiene rubber (SBR), as a first binder, in distilled water in amounts of 95.7 wt %, 1 wt %, 1 wt %, and 2.3 wt %, respectively, and a second negative electrode active material composition was prepared by mixing the same negative electrode active material, conductive agent, thickener, and binder in distilled water in amounts of 95.7 wt %, 1 wt %, 1 wt %, and 1.7 wt %, respectively.

A copper (Cu) thin film negative electrode collector was coated with the first negative electrode active material composition in a loading amount of 1.5 mAh/cm² to 2.5 mAh/cm² and subjected to primary drying at 90° C. to form a first negative electrode active material layer, and the first negative electrode active material layer was coated with the second negative electrode active material composition in the same loading amount and subjected to secondary drying at 60° C. to form a second negative electrode active material layer. In this case, a loading ratio of the negative electrode active material of the first negative electrode active material layer to the second negative electrode active material layer was allowed to be 5:5. Thereafter, roll press was performed to prepare a negative electrode for a lithium secondary battery, and the prepared negative electrode had a porosity of 30%.

(2) Preparation of Lithium Secondary Battery 96 wt % of a positive electrode active material ($LiNi_{0.6}Mn_{0.2}Co_{0.2}O_2$), 2.5 wt % of a binder (KF1100), and 1.5 wt % of a conductive agent (Super-C) were mixed in a solvent (N-methyl-2-pyrrolidone, NMP) to prepare a positive electrode active material composition.

One surface of a 20 μm thick aluminum (Al) thin film, as a positive electrode collector, was coated with the positive electrode active material composition and dried, and roll press was then performed to prepare a positive electrode.

An electrolyte solution was prepared by dissolving 1.0 M $LiPF_6$ in a solvent in which vinylene carbonate was added to a solvent in which ethylene carbonate, diethyl carbonate, and dimethyl carbonate were mixed in a volume ratio of 1:1:2.

The positive electrode and negative electrode thus prepared as well as a separator were used to prepare a battery by a typical method, and the preparation of the lithium secondary battery was then completed by injecting the prepared electrolyte solution.

Example 2

A lithium secondary battery was prepared in the same manner as in Example 1 except that a weight ratio of the second binder to the second negative electrode active material composition was 2.3 wt %.

Comparative Example 1

A negative electrode active material composition was prepared by mixing a negative electrode active material, in which artificial graphite and natural graphite having an average diameter ($D_{50}$) of 10 μm to 20 μm were mixed, acetylene black (conductive agent), CMC (thickener), and a styrene-butadiene rubber (SBR, binder) in distilled water in amounts of 95.7 wt %, 1 wt %, 1 wt %, and 2.3 wt %, respectively, and a copper (Cu) thin film negative electrode collector was coated with the negative electrode active material composition in a loading amount of 3 mAh/cm² to 6 mAh/cm² and dried at 90° C. to form a negative electrode active material layer. Thereafter, roll press was performed to prepare a negative electrode for a lithium secondary battery including a single-layered negative electrode active material, and the prepared negative electrode had a porosity of 30%.

Comparative Example 2

A lithium secondary battery was prepared in the same manner as in Example 2 except that the primary drying temperature was allowed to be equal to the secondary drying temperature.

Experimental Example 1: Evaluation of Adhesion of Electrode

Figure 2:
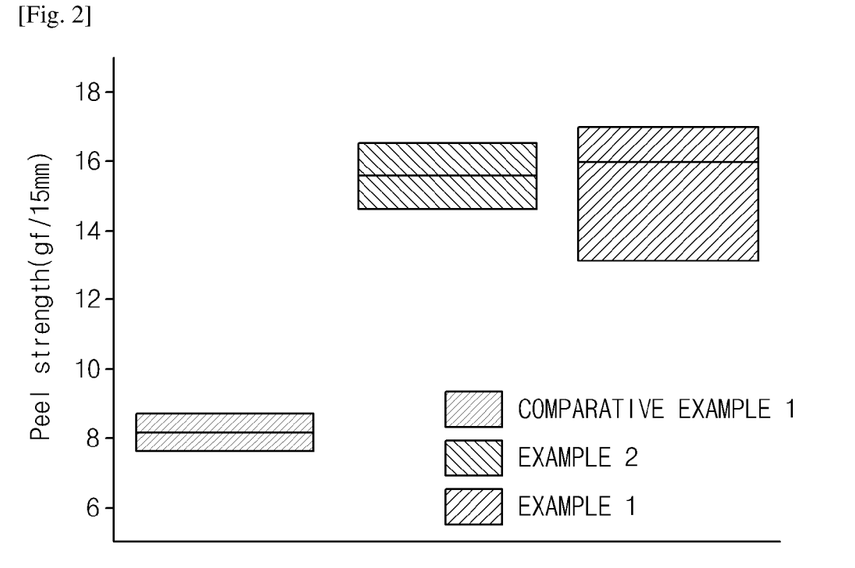
FIG. 2 is a graph illustrating adhesion properties of the negative electrodes for a secondary battery prepared according to Examples and Comparative Example of the present invention.

Adhesions of the negative electrodes for a lithium secondary battery prepared in Examples 1 and 2 and Comparative Example 1 were compared by using a generally known 180° peel test, in which a force (gf) applied until a tape was peeled off was measured while the tape was pulled at a speed of 10 mm/min, and the results thereof are presented in FIG. 2.

As illustrated in FIG. 2, with respect to the single-layered negative electrode of Comparative Example 1, it may be understood that the adhesion of the electrode was very poor in comparison to those of the multi layer-structured negative electrodes of Examples 1 and 2. Also, with respect to Example 1 in which drying was performed by setting the secondary drying temperature lower than the primary drying temperature, and the amount of the binder in the second negative electrode active material layer was lower than the amount of the binder in the first negative electrode active material layer, it may be understood that the adhesion was not reduced and was equal to or better than that of Example 2 in which a total amount of the binder in the electrode was greater.

Experimental Example 2. Resistance and Charge Time Measurements

Charging characteristics of the batteries were evaluated by measuring liquid diffusion resistance and charge time for the lithium secondary batteries prepared in Examples 1 and 2 and Comparative Example 1. Specifically, after EIS resistance was measured, the liquid diffusion resistance may be obtained by profile fitting, and, with respect to the charging characteristics, a C-rate test was performed at 0.8 C, 1 C, 1.2 C, 1.5 C, 1.8 C, and 2.0 C in a voltage range of 2.5 V to 4.2 V. The charge time denotes a time taken for multi-step charging for each C-rate as much as charge capacity based on a slope change interval i.e., an inflection point (estimated as a point at which Li-plating occurs), obtained by differentiating a charging profile. In this case, 10 sec rest was included for each step, and multi-step charging was performed from a fully discharged state to a SOC of 80% or a cut-off voltage of 4.2 V. The results thereof are presented in the following Table 1 and FIGS. 3 and 4.

TABLE 1

|  | Example 1 | Example 2 | Comparative Example 1 |
|---|---|---|---|
| Liquid diffusion resistance | 2.68 | 2.964 | 3.14 |

As illustrated in Table 1, with respect to the single-layered negative electrode of Comparative Example 1, it may be understood that the resistance of the electrode was significantly larger than those of Examples 1 and 2 as the multi layer-structured negative electrodes. Also, with respect to Example 1 in which the amount of the binder in the second negative electrode active material layer was lower than the amount of the binder in the first negative electrode active material layer, it may be understood that the resistance of the electrode was further reduced in comparison to Example 2 in which the total amount of the binder in the negative electrode was greater.

Figure 3:
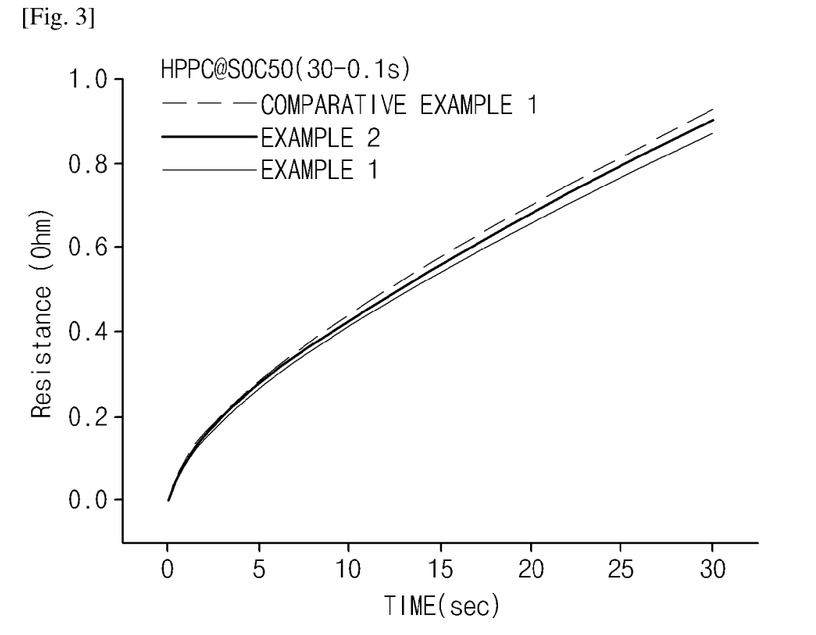
FIG. 3 is a graph illustrating the results of measuring resistances of secondary batteries prepared according to Examples and Comparative Example of the present invention.

Furthermore, in FIG. 3, as a result of separately measuring the diffusion resistance by applying a pulse, it may be confirmed that the diffusion resistances of Examples 1 and 2 were reduced in comparison to that of Comparative Example 1, and, particularly, Example 1 was reduced to a greater extent.

Figure 4:
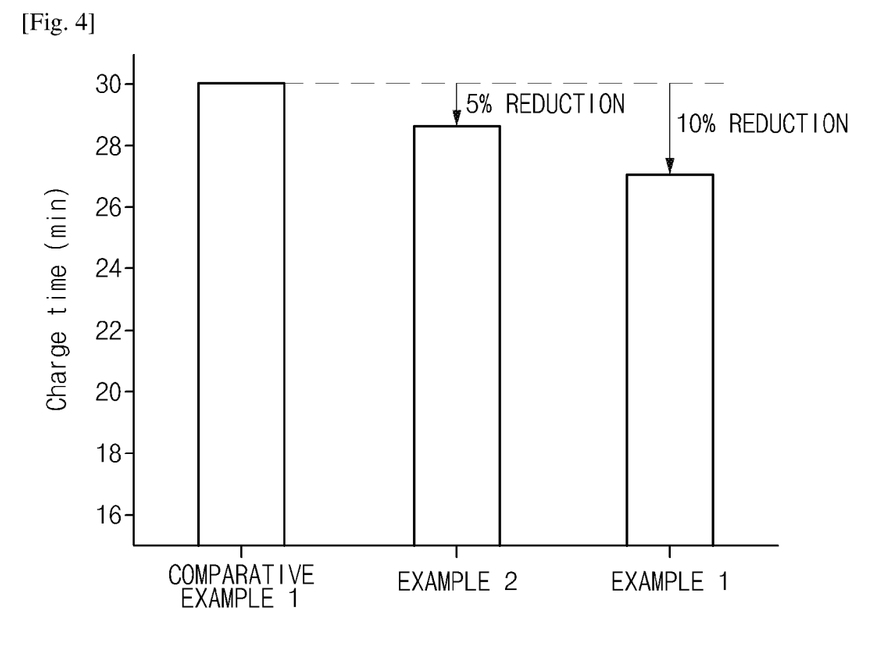
FIG. 4 is a graph illustrating charging characteristics of the secondary batteries prepared according to Examples and Comparative Example of the present invention.

Also, as illustrated in FIG. 4, with respect to the single-layered negative electrode of Comparative Example 1, it may be understood that, since the charge time is longer than those of Examples 1 and 2 as the multi layer-structured negative electrodes, charge characteristics were relatively poor, and, with respect to Example 1 in which the amount of the binder in the second negative electrode active material layer was lower than the amount of the binder in the first negative electrode active material layer, it may be understood that charge characteristics were further improved in comparison to Example 2 in which the total amount of the binder in the negative electrode was greater.

Thus, since the method of preparing an electrode for a lithium secondary battery of the present invention and the electrode for a lithium secondary battery prepared thereby may suppress the migration of the binder and may uniformly control the distribution of the binder in the electrode by forming a plurality of negative electrode active material layers and allowing a drying condition of each of the negative electrode active material layers to be different, the method of preparing an electrode for a lithium secondary battery of the present invention and the electrode for a lithium secondary battery prepared thereby may improve life characteristics by improving the adhesion between the negative electrode active material and the current collector to equal or better and may simultaneously improve charging characteristics by reducing the interfacial resistance of the negative electrode.

The foregoing description of the invention is illustrative only, and it will be understood by those skilled in the art that various changes in form and details may be made therein without departing from the spirit and scope of the invention as defined by the appended claims. Accordingly, it is to be understood that the various embodiments has been described by way of illustration and not limitation.

The invention claimed is:

1. A method of preparing a negative electrode for a lithium secondary battery, the method comprising:
    (a) preparing a negative electrode collector;
    (b) coating the negative electrode collector with a first negative electrode active material composition including a first negative electrode active material and a first binder;
    (c) performing primary drying of the coated first negative electrode active material composition at a primary drying temperature to form a first negative electrode active material layer;
    (d) coating the first negative electrode active material layer with a second negative electrode active material composition including a second negative electrode active material and a second binder; and
    (e) performing secondary drying of the coated second negative electrode active material composition at a secondary drying temperature to form a second negative electrode active material layer,
    wherein the secondary drying temperature is lower than the primary drying temperature,
    wherein the secondary drying temperature is 40° C. to 60° C.,
    wherein the secondary drying is the only drying performed on the second negative electrode active material composition, and
    wherein a weight percent of the first binder to the first negative electrode active material composition is in a range of 2.0 wt % to 3.0 wt %, and
    a weight percent of the second binder to the second negative electrode active material composition is in a range of 1.0 wt % to 2.5 wt %.

2. The method of claim 1, wherein the secondary drying temperature is 30° C. to 60° C. lower than the primary drying temperature.

3. The method of claim 1, wherein a weight ratio of the first binder of the first negative electrode active material layer to the second binder of the second negative electrode active material layer is in a range of 5:5 to 6:4.

4. The method of claim 1, wherein the first binder and the second binder are the same or different from each other.

5. The method of claim 1, wherein a loading ratio of the negative electrode active material of the first negative electrode active material layer to the second negative electrode active material layer is in a range of 5:5 to 6:4.

6. The method of claim 1, wherein a loading amount of the entire multilayer-structured negative electrode active material including the first and second negative electrode active material layers is in a range of 3 mAh/cm$^2$ to 6 mAh/cm$^2$.

7. A negative electrode for a lithium secondary battery prepared by the method of claim 1, the negative electrode comprising: a negative electrode collector; a first negative electrode active material layer including a first negative electrode active material and a first binder and formed on the negative electrode collector; and a second negative electrode active material layer including a second negative electrode active material and a second binder and formed on the first negative electrode active material layer, wherein a weight ratio of the second binder included in the second negative electrode active material layer is smaller than a weight ratio of the first binder included in the first negative electrode active material layer.

8. The negative electrode for a lithium secondary battery of claim 7, wherein the first binder and the second binder are the same or different from each other.

9. The negative electrode for a lithium secondary battery of claim 7, wherein a loading ratio of the negative electrode active material of the first negative electrode active material layer to the second negative electrode active material layer is in a range of 5:5 to 6:4.

10. A lithium secondary battery comprising the negative electrode of claim 7.

* * * * *